Patented July 28, 1953

2,647,115

UNITED STATES PATENT OFFICE 2,647,115

CYANINE DYES

William Howells Vinton, Parlin, N. J., assignor to E. I. du Pont de Nemours and Company, Wilmington, Del., a corporation of Delaware No Drawing. Application June 30, 1950, Serial No. 171,547

5 Claims. (Cl. 260—240.65)

This invention relates to new cyanine dye salts and intermediates therefor and to their preparation. More particularly, it relates to cyanine dye salts where the salt-forming anion is a cyclohexanesulfonate. The invention also relates to photographic silver halide emulsions containing the novel salts.

An object of this invention is to provide improvements in the art of cyanine dyes. Another object is to provide new dye salts for the sensitization of photographic emulsions. A further object is to provide cyanine dye salts of enhanced solubility. A still further object is to provide new cyanine dye salts which can readily be incorporated with photographic solutions from aqueous solutions. Still other objects will be apparent from the following description of the invention.

It has been discovered that the lower alkyl esters of cyclohexanemonosulfonic acid and its monoalkyl substitution derivatives of 1 to 3 carbon atoms react readily and smoothly with heterocyclic nitrogen bases which contain a reactive methyl group in the α- or γ-position to the heterocyclic nitrogen atom and form quaternary or cycloammonium salts. It has been further discovered that the salts can be readily converted into cyanine dyes by various condensation reactions. A practical method involves condensation of the salt with an ortho ester of a monocarboxylic acid in the presence of an acid binding agent, e. g., a liquid amine such as pyridine, piperidine, dimethylamine, trimethylamine, diethylamine, triethylamine, etc. Other methods include reacting the cycloammonium cyclohexanesulfonates containing a reactive methyl group in the α- or γ-position with diphenylformamidine and further reacting the intermediate thus formed with a heterocyclic quaternary salt having a reactive methyl. The heterocyclic nitrogen salts may contain a benzothiazole, benzoxazole, naphthoxazole, quinoline, trimethylindolenine, etc., ring. The salt-forming reaction and condensation reaction may be carried out stepwise or simultaneously, preferably the latter. The cyanine dye quaternary salts formed have as the anion the negative radical of a cyclohexanemonosulfonic acid.

The quaternary or cycloammonium salts of the lower alkyl esters of cyclohexanemonosulfonic acid may be represented by the general formula:

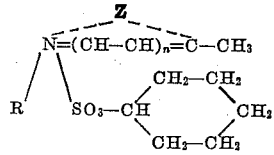

where Z constitutes the atoms necessary to complete a heterocyclic nitrogen radical of the type contained in cyanine dyes, R is a hydrocarbon radical joined to N through an aliphatic carbon atom and $n$ is a cardinal number taken from the group consisting of 0 and 1. One of the hydrogen atoms in the cyclohexane ring can be replaced by an alkyl radical of 1 to 10 carbon atoms, e. g., decyl, methyl, ethyl. The heterocyclic nitrogen radical constituted by Z and the other atoms shown may be selected from the class consisting of thiazoline, thiazole, benzothiazole, benzoxazole, benzoselenazole, benzimidazole, naphthothiazole, naphthoxazole, naphthoselenazole, quinoline, α-naphthoquinoline, β-naphthoquinoline, lepidine, indolenines. These salts can be condensed in the same manner as other salts such as the ethyl p-toluenesulfonates and ethyl ethosulfates to form symmetrical and unsymmetrical mono- and polymethine dyes.

A group of azole carbocyanine dye salts constituting a preferred aspect of the invention are represented by the general formula:

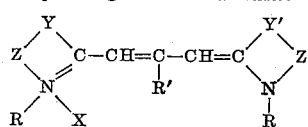

where R is an alkyl radical of 1 to 3 carbon atoms, e. g., methyl, ethyl and propyl or is an aralkyl radical, e. g., benzyl and naphthylmethyl, X is a cyclohexanesulfonic acid radical, Y and Y' is a chalcogen taken from the group consisting of oxygen, selenium and sulfur, or

and may be the same or different, R' is a member taken from the group consisting of hydrogen, alkyl of 1 to 3 carbon atoms and Z constitutes the atoms necessary to complete an azole radical.

Example I

In a reaction vessel there were placed 1.49 g. (0.01 mole) of 2-methylbenzothiazole and 1.789 (0.01 mole) of methyl cyclohexanesulfonate. This mixture was heated in an oil bath at a temperature from 130–140° C. for a period of three hours. There was then added 10 ml. of anhydrous pyridine and 4 ml. (0.024 mole) of ethyl orthoacetate and the mixture was heated under reflux at a temperature of 116° C. for a period of 10 minutes. The solution was cooled and the carbocyanine dye salt was precipitated from the reaction mixture by the addition of diethyl ether. It was recrystallized from acetone solution and the purple crystals had a melting point from 226 to 227° C. and the dye salt had the following structural formula:

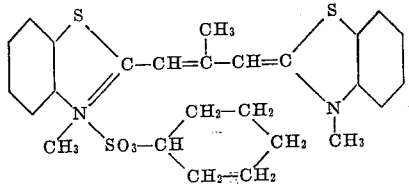

An ethanol solution of the dye was purple in color and had an absorption maximum at 541 millimicrons. The dye salt was soluble to the extent of 1.85 g. per 100 ml. of water at 25° C. as compared with 0.069 g. for the corresponding methyl p-toluenesulfonate salt.

The dye salt was added to a negative type cine gelatino silver iodobromide emulsion and was found to be a strong sensitizer extending the sensitivity to 660 millimicrons with maxima at 540 and 600 millimicrons.

Example II

In a reaction vessel there were placed 1.49 g. (0.01 mole) of 2-methylbenzothiazole and 1.78 g. (0.01 mole) of methyl cyclohexanesulfonate. This mixture was heated in an oil bath at a temperature of 130 to 140° C. for a period of three hours. There was then added 3 ml. (.018 mole) of ethyl orthoformate and 20 ml. of anhydrous pyridine and the resulting mixture was heated for a period of ten minutes at a temperature of 116° C. The carbocyanine dye salt which was formed was precipitated by the addition of diethyl ether. It was recrystallized from acetone solution and recovered in an amount of 0.54 g. The purple dye crystals had a melting point of 269 to 271° C. The dye had the following structural formula:

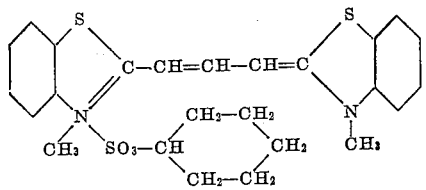

An ethanol solution of this dye salt was purple in color and had an absorption maximum at 558 millimicrons. It was added from an ethanol solution to a gelatino silver iodobromide negative motion picture emulsion and was found to extend the sensitivity to about 600 millimicrons.

Example III

In a glass reaction vessel there were placed 1.49 g. of 2-methylbenzothiazole and 1.78 g. of methyl cyclohexanesulfonate. The mixture was heated in an oil bath to a temperature of 130 to 140° C. for a period of three hours. There was then added 4 ml. (0.023 mole) of ethyl orthopropionate and 20 ml. of anhydrous pyridine. The mixture was heated to a temperature of 116° C. under conditions of reflux for a period of ten minutes. The solution was cooled and the carbocyanine dye salt was precipitated by the addition of diethyl ether. It was recrystallized from an acetone solution and recovered in an amount of 0.24 g. The purple dye had a melting point of 145–147° C. This dye had the following structural formula:

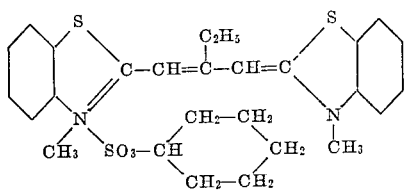

An ethanol solution of the dye salt was purple in color and had an absorption maximum at 545 millimicrons.

The dye salt was added from an ethanol solution to a gelatino silver iodobromide emulsion of the negative motion picture type and was found to extend the sensitivity to about 680 millimicrons with a maximum at 645 millimicrons.

Example IV

In a glass reaction vessel there were placed 6.06 g. (0.060 mole) of 2-methylthiazoline and 10.68 g. (0.060 mole) of methyl cyclohexanesulfonate and the reaction mixture was heated for a period of one hour at a temperature of 50° C. There was then added 8 ml. (0.048 mole) of ethyl orthoformate and 40 ml. of anhydrous pyridine and the mixture was heated to a temperature of 116° C. under conditions of reflux for a period of five minutes. The solution was cooled and the dye salt precipitated by the addition of diethyl ether. It was recrystallized from a mixture of acetone and ether and recovered in an amount of 4.62 g. The crystals were tan in color and hygroscopic. This dye had the following structural formula:

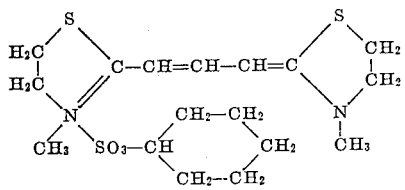

An ethyl alcohol solution of the dye showed an absorption maximum at 444 millimicrons.

A small amount of this dye was added to a gelatino silver chlorobromide lithographic type emulsion and extended the sensitivity to 500 millimicrons with a maximum at 480 millimicrons.

Example V

In a glass reaction vessel there were placed 4.47 g. (0.03 mole) of 2-methylbenzothiazole and 5.76 g. (0.03 mole) of ethyl cyclohexanesulfonate and the mixture was heated to a temperature of 120–130° C. for a period of three hours. There was then added 40 ml. of anhydrous pyridine and 8 ml. of ethyl orthoacetate and the mixture was heated to reflux for a period of 15 minutes. The reaction mixture was cooled and a purple dye precipitated. The dye was filtered off and recrystallized from acetone. A yield of 1.86 g. was obtained having a melting point of 237–239° C. An ethanol solution of the dye had an absorption maximum at 547 millimicrons. This dye had the following structural formula:

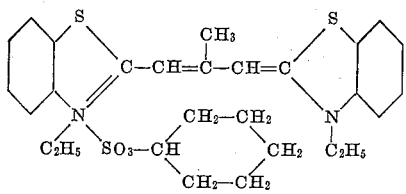

An ethanol solution of the dye salt was red in color and had an absorption maximum at 543 millimicrons.

A small amount of the dye salt was added from an ethanol solution to a gelatino iodobromide emulsion of the negative motion picture type and extended its sensitivity to about 670 millimicrons.

*Example VI*

In a glass reaction vessel there were placed 4.83 g. (0.03 mole) of 2,5,6-trimethylbenzoxazole and 5.76 g. (0.03 mole) of ethyl cyclohexanesulfonate and the reaction mixture was heated in an oil bath for a period of three hours at 120–130° C. There was then added 8 ml. of ethyl orthoformate and 40 ml. of anhydrous pyridine and the mixture was heated to reflux for 15 minutes. The mixture was cooled and a small amount of colorless salt separated out. This colorless salt was filtered off and the filtrate was diluted with ether and the dye precipitated. The resulting dye was recrystallized twice from acetone and 1.43 grams of red sparkling crystals were obtained which had a melting point of 255–256° C. This dye had the following structural formula:

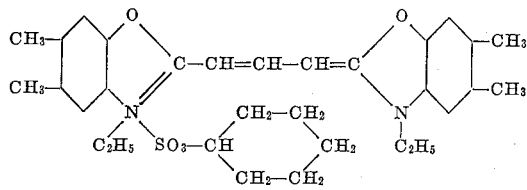

An ethanol solution of the dye had an absorption maximum at 500 millimicrons. It sensitized a chlorobromide lithographic emulsion out to 570 with a peak at 530 millimicrons.

*Example VII*

In a glass reaction vessel there were placed 6.30 g. (0.03 mole) of 2,5-dimethylbenzoselenazole and 5.76 g. (0.03) of ethyl cyclohexanesulfonate and the mixture heated over an oil bath for three hours at a temperature of 120–130° C. There was then added 40 ml. of anhydrous pyridine and 10 ml. of ethyl orthoformate and the mixture was heated to reflux for 15 minutes. A deep purple color formed and the dye precipitated on cooling the reaction mixture. The dye was filtered off and recrystallized twice from acetone. A yield of 2.46 grams of a green purple dye was obtained, having a melting point of 243–244° C. An ethanol solution of the dye had an absorption maximum at 581 millimicrons. This dye had the following structural formula:

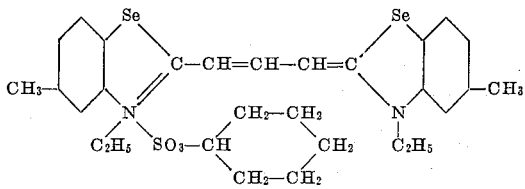

It sensitized an iodobromide gelatin emulsion out to 670 mu with a peak at 640 millimicrons.

*Example VIII*

In a reaction vessel there were placed 7.53 g. (0.03 mol.) of 2-methyl-4,5-diphenylthiazole and 5.76 g. (0.03 mol.) of ethyl cyclohexanesulfonate and the reaction mixture was heated on an oil bath for three hours at 130–140° C. There was then added 10 ml. of ethyl orthoacetate and 40 ml. of anhydrous pyridine and the mixture was heated to reflux for 15 minutes. A purple color formed and the mixture was cooled and diluted with dry ether. The dye separated as an oil and the ether was removed by decantation. The oily dye was taken up with a mixture of acetone and ether and crystallized therefrom. The dye was filtered off and recrystallized twice from acetone. A yield of 0.76 g. of dark green crystals was obtained having a melting point of 225–227° C. An ethanol solution of the dye had an absorption maximum at 564 millimicrons. This dye had the following structural formula:

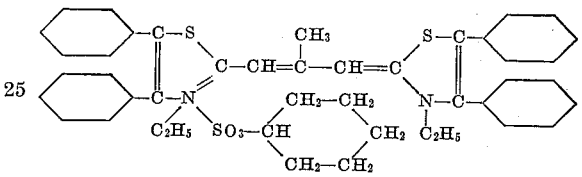

It sensitized an iodobromide gelatin emulsion out to 650 with two peaks, one at 560 millimicrons and one at 600 millimicrons.

*Example IX*

In a glass vessel there were placed 4.77 g. (0.03 mol.) of 2,3,3-trimethylindolenine and 5.76 g. (0.03 mol.) of ethyl cyclohexanesulfonate and the mixture was heated on an oil bath for three hours at 120–130° C. Then there was added 9 ml. of ethyl orthoformate and 40 ml. of anhydrous pyridine and the mixture heated to reflux for 15 minutes. A deep purple color formed and the mixture was cooled. The mixture was diluted with ether and a colorless salt separated. This was filtered off and more ether was added to the filtrate and the dye precipitated. The dye was filtered off and dissolved in an ether-acetone-alcohol mixture. The dye was recrystallized twice from this mixture. A yield of 2 g. of a red dye was obtained having a melting point of 94–96° C. An ethanol solution of the dye had an absorption maximum at 549 millimicrons. This dye had the following structural formula:

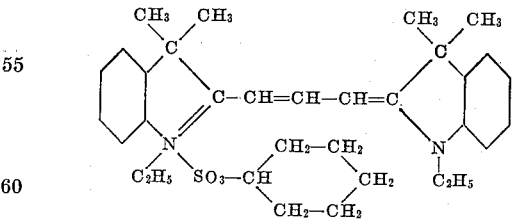

It sensitized an iodobromide gelatin emulsion out to 610 with a peak at 600 millimicrons.

*Example X*

In a suitable reaction flask there were placed 13.30 g. (0.10 mol.) of 2-methylbenzoxazole and 19.20 g. (0.10 mol.) of ethyl cyclohexanesulfonate. The mixture was heated together for 4 hours at 140° C. and then there was added 20.00 g. (0.10 mol.) of diphenylformamidine and 200 ml. of acetic anhydride. The mixture was then refluxed for 30 min. while a deep yellow-orange color formed. After diluting the mixture to three liters with dry diethyl ether, the ethyl cyclohexanesulfonate salt of 2-methylbenzoxazole separated as an oil. The oil was dissolved in acetone (200 ml.) and the solution was diluted with ether. After standing for some time, the salt crystallized; it was filtered off, washed with acetone, and air dried to yield 2.75 g. of yellow solid; M. P. 205–7° C. This quaternary salt can be condensed by conventional methods to form symmetrical or unsymmetrical dyes.

Example XI

In a flask there were placed 0.745 g. (0.005 mol.) of 2-methylbenzothiazole and 0.96 g. (0.005 mol.) of ethyl cyclohexanesulfonate. The mixture was heated together for 4 hours at 140° C. and then for 16 hours at 110° C. At this point there was added 2.37 g. (0.005 mol.) of the quaternary salt described in Example X and 15 ml. of dry pyridine. The mixture was refluxed for 15 minutes during which time a deep red color formed. After diluting the solution with diethyl ether, a dye crystallized. It was filtered off, recrystallized from a mixture of acetone and dry diethyl ether to yield 0.65 g. (25% of theory) of purple, sparkling crystals; M. P. 223–226° C. and had the formula:

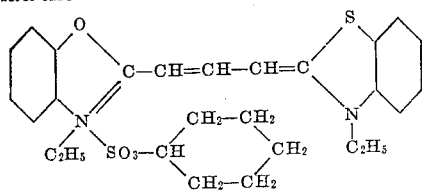

The dye had an absorption maximum in 95% ethanol solution at 523 millimicrons. It sensitized a chlorobromide gelatin lithographic emulsion out to 590 millimicrons with a peak at 500 millimicrons.

Example XII

In a suitable flask there were placed 5.25 g. (0.03 mol.) of 2-methylmercaptoquinoline and 5.76 g. (0.03 mol.) of ethyl cyclohexanesulfonate. The mixture was heated together for 3 hours at 120–130° C. Then in a separate flask there were placed 6.30 g. (0.03 mol.) of 2,5-dimethylbenzoselenazole and 5.76 g. (0.03 mol.) of ethyl cyclohexanesulfonate. This mixture was heated for three hours at 120–130° C. Then each of the fused quaternary salts was dissolved in 20 ml. of ethyl alcohol. The two solutions were combined and heated to reflux with the addition of 3.03 g. (0.03 mol.) of triethylamine. The mixture was refluxed for 15 minutes during which time an orange color formed, but the dye did not crystallize on cooling. Therefore, there was added a mixture of acetone and diethyl ether (50–50 by volume), and the dye crystallized. It was filtered off, washed with acetone and then recrystallized twice from acetone to yield 2.2 g. (13% of theory) of orange red dye; M. P. 254–5° C. of the formula:

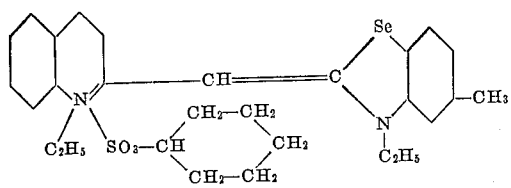

This dye had an absorption maximum in ethanol solution at 496 millimicrons.

Similar dye intermediates and dyes can be made from homologues of the esters of cyclohexanesulfonic acid such as methyl 2-methylcyclohexanesulfonate, methyl 4-methylcyclohexanesulfonate, ethyl 2-ethylcyclohexanesulfonate. Thus, the cyclohexane radical may contain an alkyl radical of 1 to 10 carbon atoms in the 2, 3 or 4 position. When these esters are substituted in equivalent amount in the salt-forming and dye condensation reactions a series of new quaternary salts are formed which have considerable utility in the arts.

Photographic emulsions can be prepared from the cyanine alkyl or aralkyl cyclohexane-sulfonates in any of the conventional manners by admixing an aqueous solution or organic solvent solution of the dye with the fluid emulsion or by bathing or impregnating an emulsion layer with such a solution. Since the new cyanine salts have a high degree of solubility in water, aqueous solutions may be advantageously employed. Water-miscible solvents, e. g., methanol, ethanol, are good solvents for the new salts.

The concentration of the cyanine alkyl or aralkyl cyclohexanesulfonates used in the emulsions can vary widely, e. g., from about 2 to 100 mg. per liter of ordinary fluid colloid-silver halide emulsion. The concentration will, of course, vary depending on the particular silver halides in the emulsion, the colloid binding agent and according to the effects desired.

The cyanine dye salts of this invention are useful photographic sensitizing dyes and may be incorporated with colloid-silver halide emulsions of various types including silver chloride, silver bromide, silver chlorobromide, silver iodobromide, simple and mixed emulsions. Various types of colloids can be used as binding agents for the light-sensitive silver halide grains, e. g., gelatin, albumin, agar agar; hydrophilic cellulose acetate, polyamides, hydrolyzed ethylene vinyl acetate copolymers; polyvinyl alcohol, polyvinyl acetals, etc., hydrophilic colloid color formers, e. g., polyvinyl acetals of color-forming aldehydes.

The new cyanine salts find utility in color former emulsions which contain color formers for color coupling development in addition to the silver salts. They may be used with color formers such as phenols, naphthols, acylacetic acid esters, acylacetic acid amides, cyanoacetic acid amides, pyrazolones, etc., including such compounds which contain high molecular weight groups which render them fast to diffusion and/or colloidal in character. They are especially useful in polyvinyl acetal color former emulsions of the type disclosed in U. S. Patent 2,397,865.

An advantage of the invention is that it provides a new class of cycloammonium salts which can be used to prepare a large number of cyanine dyes. A further advantage is that it provides a new class of cyanine salts.

A further advantage is that it provides cyanine dye salts which have a high degree of water-solubility and ethanol-solubility. They do not leave an objectionable residual stain in the developed and fixed elements. This makes them especially useful in photographic papers. The invention has the further advantage that the preparation of the new cyanine dye salts is less hazardous in that alkyl cyclohexanesulfonates are markedly less toxic to the skin, mucous membrane and eyes than dialkylsulfates.

As many widely different embodiments of this invention can be made without departing from the spirit and scope thereof, it is to be understood that the invention is not to be limited except as defined by the claims.

What is claimed is:
1. The symmetrical and unsymmetrical carbocyanine compounds having the general formula:

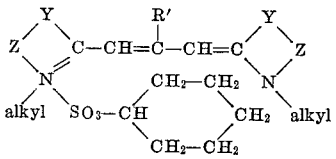

where alkyl contains from 1 to 3 carbon atoms, R' is a member taken from the class consisting of hydrogen and an alkyl radical of 1 to 3 carbon atoms, Y and Y' are chalcogens taken from the group consisting of oxygen, selenium and sulfur and Z constitute the atoms necessary to complete an azole radical.

2. The carbocyanine dye salt of the formula:

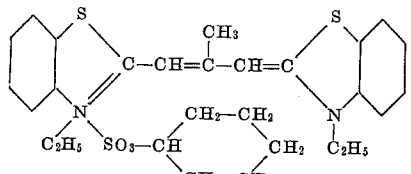

3. The carbocyanine dye salt of the formula:

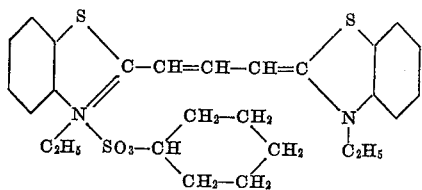

4. The carbocyanine dye salt of the formula:

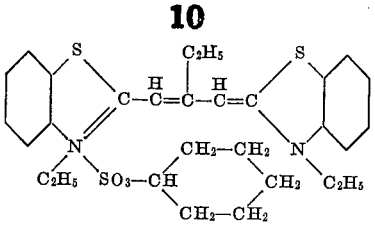

5. The carbocyanine dye salt of the formula:

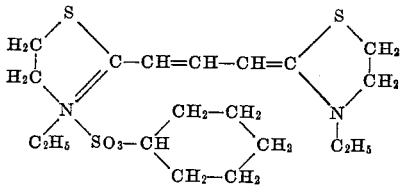

WILLIAM HOWELLS VINTON.

References Cited in the file of this patent
UNITED STATES PATENTS

| Number | Name | Date |
|---|---|---|
| 1,934,657 | Brooker | Nov. 7, 1933 |
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,330,203 | Brooker et al. | Sept. 28, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,495,260 | Jennen et al. | Jan. 24, 1950 |
| 2,508,325 | Anish | May 16, 1950 |

OTHER REFERENCES

Chemical Abstracts 16:3101 (Abst. of Brit. Med. Jour., 1922, I, 514–515).

Chemical Abstracts 19:530 (Abst. of Proc. Roy. Soc., London, 96 B, 317–333, 1924).